(12) United States Patent
Amborn et al.

(10) Patent No.: US 6,205,736 B1
(45) Date of Patent: Mar. 27, 2001

(54) STRUCTURAL FRAME ELEMENT

(76) Inventors: Ing Peter Amborn, In den Gärten 2, D-53819, Neunkirchen (DE); Simon Jonathan Giles Griffiths, c/o GKN Sankey Limited, Engineering Products Division, Hadley Castle Works, P.O. Box 83, Hadley, Telford, Shropshire, TF1 4RE (GB)

( * ) Notice: Subject to any disclaimer, the term of this patent is extended or adjusted under 35 U.S.C. 154(b) by 0 days.

(21) Appl. No.: 09/298,050

(22) Filed: Apr. 22, 1999

(51) Int. Cl.[7] ............................................. E04B 1/19
(52) U.S. Cl. ........................ 52/633; 52/634; 52/636; 52/648.1; 52/653.2; 52/638; 296/205; 296/203.01
(58) Field of Search ................................ 52/633, 634, 636, 52/648.1, 653.2, 638, 650.1, 650.3; 296/205, 203.01

(56) References Cited

U.S. PATENT DOCUMENTS 5,285,613 * 2/1994 Goldsworthy ..................... 52/648.1
5,720,092 * 2/1998 Ni et al. .
5,799,524 * 9/1998 Schafer et al. .
6,026,626 * 2/2000 Fisher ................................... 52/633

* cited by examiner

Primary Examiner—Christopher T. Kent
Assistant Examiner—Jennifer I. Thissell
(74) Attorney, Agent, or Firm—Kilpatrick Stockton

(57) ABSTRACT

A space frame including at least two elongate structural frame elements arranged side by side and being interconnected by a plurality of elongate struts spaced along the length of the elements, each structural frame element comprising an elongate hollow body having one or more strut connection nodes located along its length at predetermined positions, each connection node being in the form of a socket extending internally of the element, the socket comprising a socket wall depending from one side wall of the hollow body, the socket wall defining a socket recess and being formed by hydro-forming from said one side wall of the hollow body, each opposite end of each strut being in the form of a plug received within the socket defined by a co-operating respective connection node. The hydro-forming process may include the use of any type of pressurised hydraulic fluid.

13 Claims, 2 Drawing Sheets

STRUCTURAL FRAME ELEMENT

The present invention relates to a structural frame element, in particular but not exclusively, for the construction of space frames.

The invention also relates to a process of constructing space frames from such elements.

A structural frame element for the construction of space frames is known from DE 4228238. The known structural frame element is hollow and elongate and is provided with connection nodes located at predetermined positions along its length, the connection nodes being in the form of laterally outwardly extending projections. When constructing a frame, at least 2 frame elements are located side by side and are joined together by a plurality of elongate connection struts spaced along the length of the elongate structural elements. Each opposite end of each strut is mounted on a node projection formed on a respective structural element.

The connection between the strut and node projection is similar to a male and female plug and socket connection wherein the male plug is defined by the node projection and the female socket is defined by the open end of the strut.

In order to provide strength in the connection and to provide rigidity in the frame, it is desirable for the node projection to be a close fit inside the socket defined in the end of the strut and for the projection to extend as far as possible along the socket in order to provide a long support face in abutment with the inner wall of the socket. These criteria are difficult to achieve with the structural element of DE 4228238 since each node projection is formed by stretching the material of the element outwardly and so there is a limit to the amount of elongation of this material before it becomes too weak. In addition the forming process necessarily requires the transition zone between the node and wall of the structural member to be of a relative large radius and this necessarily reduces the effective length of the node projection.

In order to avoid axial separation between the node projection and the strut mounted thereon, it is normal practice to weld the end edge of the strut to the adjacent surface of the structural element. Since the available space between the strut and structural element is restricted due to the transition zone of the node projection being located within the strut welding is difficult.

It is a general aim of the present invention to provide a structural element for constructing space frames which overcomes disadvantages associated with the type of structural frame element disclosed in DE 4228238.

According to one aspect of the present invention there is provided a structural frame element comprising an elongate hollow body having one or more strut connection nodes located along its length at predetermined positions, each connection node being in the form of a socket extending internally of the element, the socket comprising a socket wall depending from one side wall of the hollow body, the socket wall defining a socket recess and being formed by hydro-forming from said one side wall of the hollow body.

According to another aspect of the present invention there is provided a space frame including at least two elongate structural frame elements arranged side by side and being interconnected by a plurality of elongate struts spaced along the length of the elements, each structural frame element comprising an elongate hollow body having one or more strut connection nodes located along its length at predetermined positions, each connection node being in the form of a socket extending internally of the element, the socket comprising a socket wall depending from one side wall of the hollow body, the socket wall defining a socket recess and being formed by hydro-forming from said one side wall of the hollow body, each opposite end of each strut being in the form of a plug received within the socket defined by a co-operating respective connection node.

In this specification the term 'hydro-forming' includes any forming process which utilises a pressurised hydraulic fluid for deforming an element; the pressurised hydraulic fluid may be a solid such as small solid balls which collectively act as a fluid; a liquid such as a suitable oil; or a gas such as steam. The hydro-forming process is performed within a die and may be performed at cold or warm temperatures.

Various aspects of the present invention are herein after described with reference to the accompanying drawings in which.

Figure 1:
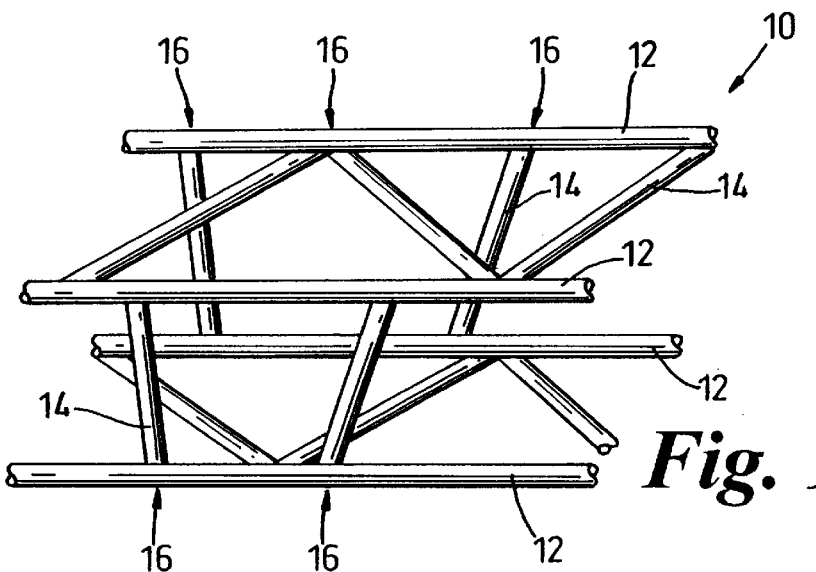
FIG. 1 is a schematic perspective view of a space frame constructed according to the invention
Figure 2:
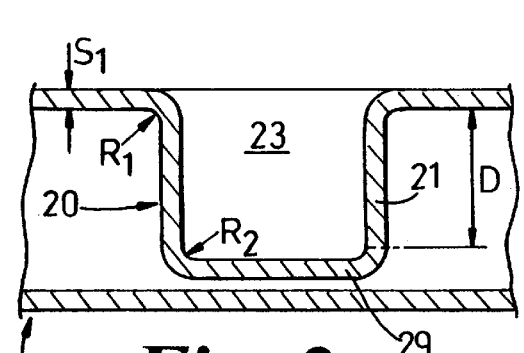
FIG. 2 is an axial section through part of a structural frame element according to a first embodiment of the invention

Referring initially to FIG. 1 there is shown a space frame 10 comprising four structural frame elements 12 extending side by side and being joined together by a plurality of connection struts 14. The struts 14 are spaced along the length of the structural elements 12 and each strut 14 is connected to a respective pair of elements 12 at node locations 16 spaced at predetermined positions and angles along the length of the elements 12.

The frame 10 shown in FIG. 1 is of box-like form and is of a type as used as a space frame in the manufacture of vehicles. For such an application it is desirable that the space frame be light in weight and as rigid as possible. It is preferred therefore that the elements 12 and struts 14 comprise elongate hollow bodies 17,19 respectively of predetermined wall thickness $S_1$ formed from a suitable structural material.

Preferably the structural material is a metal such as steel, aluminium or aluminium alloy. It will be appreciated that the elements 12 and struts 14 may be of the same material or of a different material.

Figure 3:
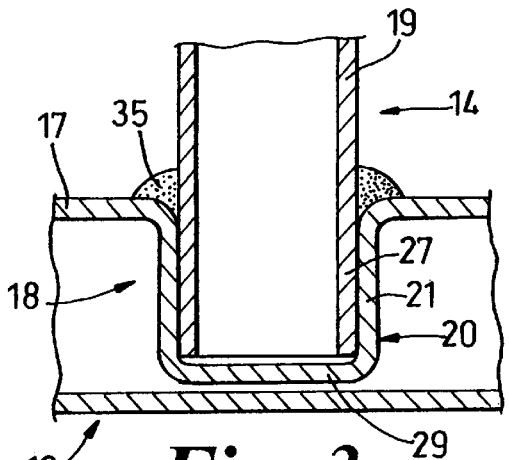
FIG. 3 is a view similar to FIG. 2 showing one end of a strut connected to the frame element.

As more clearly shown in FIG. 3, the connection between the end of a strut 14 and the respective element 12 at each node location 16 is defined by a plug and socket type connection 18. In this respect, each element 12 at each node location 16 is provided with a socket 20 which extends internally of the body 17 of the element 12.

The socket 20 is formed by hydro-forming so as to have a socket wall 21 which over the depth D of the socket 20 defines a socket recess 23 which in cross sectional shape and dimensions is substantially constant throughout its depth D.

The cross-sectional shape and dimensions of the socket recess 23 are chosen to be substantially the same as the external cross-sectional shape and dimensions of the end of the co-operating strut 14 such that the end portion of the strut forms a close fitting plug 27. The pressurised fluid may be small solid balls which collectively act as a fluid, or may be a liquid such as a suitable oil or may be a gas such as air or steam. The pressurised fluid may be warm or cold.

It is envisaged that the socket 20 would be formed by a hydro-forming technique. This is preferably done inwardly deforming the wall of body 17 whilst the body 17 is filled with a pressurised fluid. Inward deformation is achieved using an appropriate pressing tool such as a punch and due to the support given by the pressurised fluid it is possible to control the shaping process to close tolerances and create radii $R_1$ and $R_2$ which are of relatively small dimensions; $R_1$ being the radius at the transition zone between the outer wall of body 17 and the socket wall 21 and $R_2$ being the radius of the transition zone between the bottom wall 29 of the socket and socket wall 21. The radii $R_1$ and $R_2$ being of small dimension is particularly advantageous as it maximises the depth D for the socket over which the recess is of constant cross section.

The hydraulic fluid may be hot in order to facilitate the forming process, viz the hotter the fluid the easier it is to deform the material of the wall of body 17. By increasing the pressure of the hydraulic fluid, it is possible to obtain a smaller radii $R_1$ or $R_2$. Preferably the pressure of the hydraulic fluid and/or its temperature are chosen such that the radii $R_1$ and $R_2$ fall with the range of 1 to 4 times the wall thickness $S_1$, viz $S_1 \leq R_1$, $R_2 \leq 4(S_1)$.

By the appropriate choice of the closeness of manufacturing tolerance between the plug 27 and socket recess 23 it is possible to obtain a tight fit between the plug 27 and socket recess 23 and thereby reduce relative movement therebetween to a minimum.

Preferably in order to provide a rigid connection the depth D of the recess is chosen to be as long as possible in order to provide face to face contact between the plug and socket over as great an axial distance as possible. However the maximum length is determined by the elongation ratio of the material from which body 17 is made and so the length should not exceed this ratio otherwise the socket wall 21 would become too weak and the rigidity of the joint would be compromised. It will be appreciated that the elongation ratio is dependent upon the temperature of the hydraulic fluid and so it is envisaged that recesses of longer length may be achieved using fluid at elevated temperatures.

Figure 4:
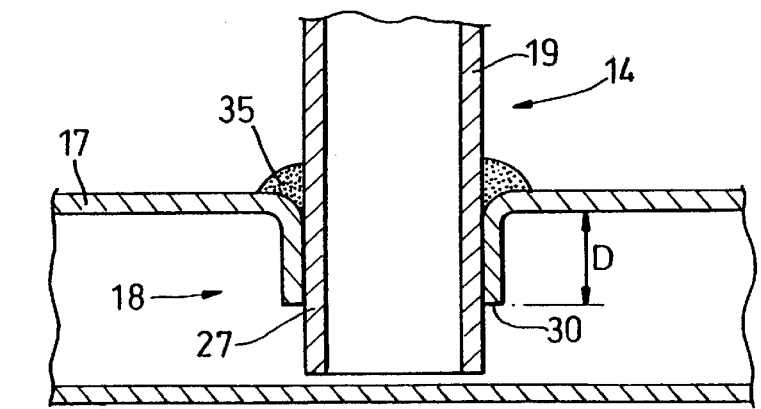
FIG. 4 is a view similar to FIG. 3 showing a second embodiment according to the present invention.

It is envisaged that the bottom of the socket recess may be open as shown in FIG. 4 so as to permit the plug to enter deeper internally of the element 12. In such an arrangement there is no internal radius $R_2$ and so the effective depth of the recess is the full length of socket wall 21 from its terminal end 30 to just below the external surface of the body 17. Such an arrangement is particularly advantageous when using materials having a small elongation ratio.

Preferably as shown in FIGS. 3 and 4 the terminal end of the socket wall 21 is spaced from the opposed side wall of the body 17. This is advantageous as it prevents the terminal end of the socket wall 21 from rubbing against the opposed side wall and thereby avoids vibration noise and possible wear damage to the opposed wall.

Figure 6:
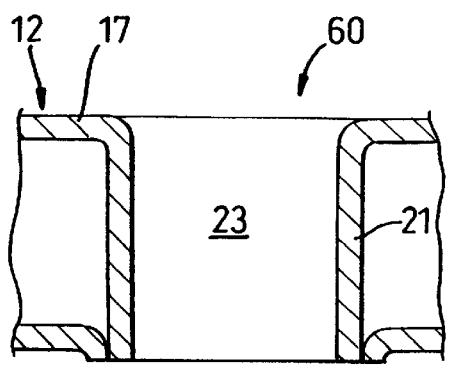
FIG. 6 is an axial section through part of a structural frame element according to a fourth embodiment according to the present invention.
Figure 7:
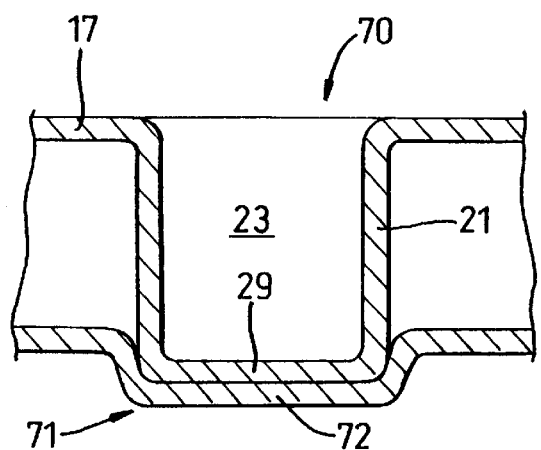
FIG. 7 is an axial section through part of a structural frame element according to a fifth embodiment according to the present invention.

In the embodiments 60, 70 respectively illustrated in FIGS. 6 and 7, the socket wall 21 is extended so as to be fixedly secured to the opposed side wall of the element 12.

In embodiment 70, the bottom wall 29 and adjacent portion of socket wall 21 are received within a recess 71 formed in the opposed side wall. The recess 71 is preferably formed simultaneously during the hydro-forming process by the tool (not shown) responsible for forming the socket 20.

In embodiment 60, after the recess 71 has been formed, the bottom wall 72 of recess 71 and bottom wall 29 are removed to leave the terminal end of the socket 20 open ended and located within an opening formed by the removal of bottom wall 72.

For both embodiments 60, 70 the terminal end of the socket 20 is secured against lateral movement and so provides a socket 20 of increased rigidity.

Figure 8:
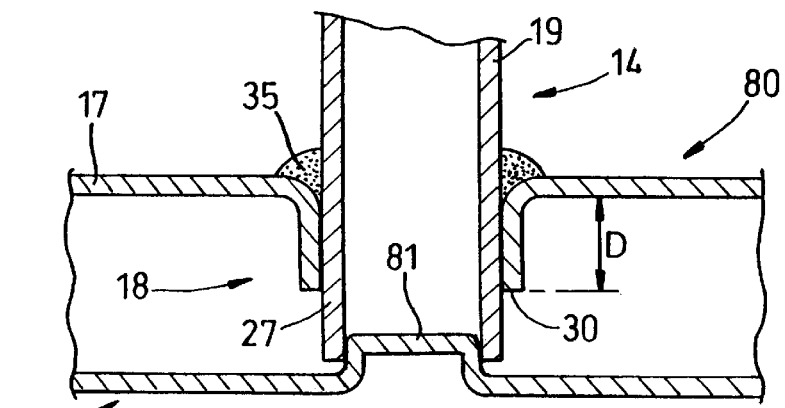
FIG. 8 is an axial section through part of a structural frame element according to a sixth embodiment according to the present invention.

In embodiment 80 (FIG. 8) a similar effect for providing increased rigidity is achieved by the provision of an additional projection 81 which engages with the terminal end of the strut 14. As seen in FIG. 8, element 12 is formed with a socket 20 in a manner similar to that shown in FIG. 4. The projection 81 is located co-axially relative to the socket 20 and extends from the opposed wall of element 12 to project internally of the terminal end of strut 14.

The projection 81 is formed so as to have a shape which engages with the internal wall of the strut 14 and thereby prevent lateral displacement of the strut 14.

The projection 81 is preferably formed by hydro-forming techniques.

In all embodiments, each strut 14 is preferably secured to the co-operating element 12 by welding 35 which preferably extends continuously around the periphery of the strut 14 adjacent to the mouth of recess 23 and so forms a weld connection between the strut 14 and the external marginal portion of the element 12 which surrounds the socket 20.

Since the transition zone of radius $R_1$, provides a lead-in to the recess 23, it facilitates insertion of the strut into the recess 23 and also defines with the external wall of the strut 14, a wide mouthed welding recess which facilitates the production of a strong weld connection. It is envisaged that the strut 14 may be secured to the element 12 by other forms of bonding as an alternative to welding.

Figure 5:
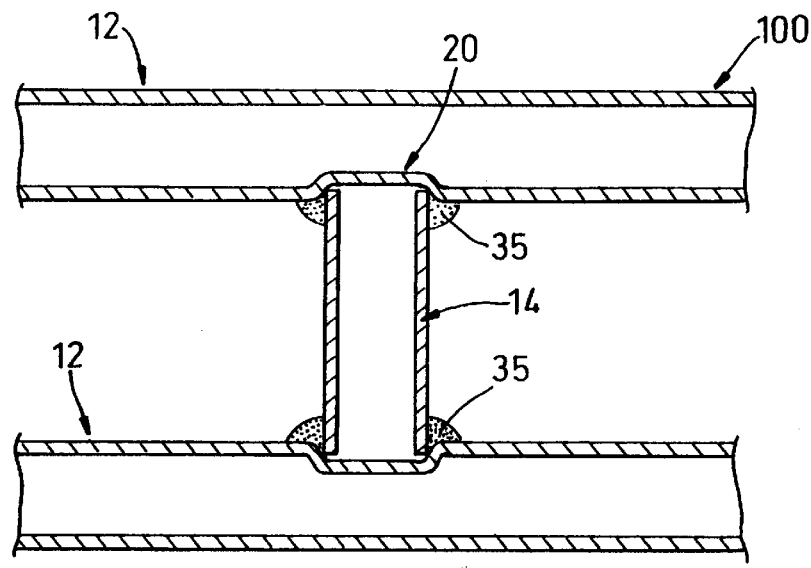
FIG. 5 is a schematic axial section through a space frame constructed from frame elements according to a third embodiment of the invention.

Since the formation of a socket 20 in the element 12 provides a wide mouthed welding recess for creating a strong weld, it is envisaged that a space frame may be constructed by the provision of a shallow socket 20 in those cases where a strongly rigid connection between the struts 14 and elements 12 is not necessary. Such a space frame 100 is shown by way of example in FIG. 5. With such a space frame 100 the sockets 20 primarily act as positional location for the struts 14 and do not co-operate therewith to provide significant lateral support.

What is claimed is:

1. A vehicle space frame comprising:

at least two elongate structural frame elements arranged side by side and being interconnected by a plurality of elongate struts spaced along the length of the elements;

each structural frame element comprising an elongate hollow body having one or more strut connection nodes located along its length at predetermined positions;

each connection node being in the form of a socket extending internally of the element, the socket comprising a socket wall depending from one side wall of the hollow body, the socket wall defining a socket recess and being formed by hydro-forming from said one side wall of the hollow body;

each opposite end of each strut being in the form of a plug received within the socket defined by a co-operating respective connection node;

the socket recess in cross-sectional shape and dimensions being substantially constant throughout its depth; and said cross-sectional shape and dimensions of said socket recess being substantially the same as the external cross-sectional shape and dimensions of said plug, such that the length of the plug located in the socket recess resides in face to face contact with said socket wall.

2. A frame according to claim 1 wherein said socket wall extends from said one side wall of the hollow body towards an opposed side wall of the hollow body, the terminal end of the socket wall terminating internally of the hollow body and being spaced from said opposed wall.

3. A frame according to claim 1 wherein said socket wall extends from said one side wall of the hollow body towards an opposed side wall of the hollow body, the terminal end portion of the socket being fixedly connected to said opposed wall.

4. A frame according to claim 3 wherein the terminal end portion of the socket wall passes through an opening formed in the opposed side wall.

5. A frame according to claim 3 wherein the terminal end portion of the socket passes into a recess formed in the opposed side wall.

6. A frame according to claim 1 wherein the socket defined by the socket wall has a depth which is less than or equal to the cross-sectional width of the socket.

7. A frame according to claim 1 wherein the socket defined by the socket wall has a depth which is greater than or equal to the cross-sectional width of the socket.

8. A frame according to claim 1 wherein said one side wall of the body has a wall thickness of $S_1$ and the transition zone between said one side wall and the socket wall has a radius $R_1$, and wherein the transition zone is hydro-formed such that $S_1 \leq R_1 \leq 4(S_1)$.

9. A frame according to claim 1 wherein each strut is fixedly secured at respective ends to the adjacent element to prevent withdrawal of the strut from the associated socket in which it is received.

10. A frame according to claim 9 wherein each strut is fixedly secured at each end to the adjacent element by a bond or weld connection located between an external marginal portion of the structural frame element surrounding the socket and said strut.

11. A frame according to claim 1 wherein the struts and structural elements are formed from the same material.

12. A frame according to claims 1 wherein the struts and structural elements are formed from different materials.

13. A structural frame element comprising an elongate hollow body having one or more strut connection nodes located along its length at predetermined positions, each connection node being in the form of a socket extending internally of the element, the socket comprising a socket wall depending from one side wall of the hollow body, the socket wall defining a socket recess and being formed by hydro-forming from said one side wall of the hollow body, the socket wall defining a terminal end of the socket which is located internally within the hollow body.

* * * * *